United States Patent

Antenucci et al.

[11] Patent Number: 5,384,311
[45] Date of Patent: Jan. 24, 1995

[54] LIQUID CONCENTRATE COMPOSITIONS

[75] Inventors: Robert N. Antenucci, Hamilton; Richard L. Barndt, Highland Park; Kas Mohammed, Hillsboro, all of

[73] Assignee: McNeil-PPC, Inc., Milltown, N.J.

[21] Appl. No.: 931,888

[22] Filed: Aug. 18, 1992

Related U.S. Application Data

[63] Continuation of Ser. No. 628,287, Dec. 14, 1990, abandoned.

[51] Int. Cl.⁶ .................. A01N 43/04; C07H 11/00; C07G 3/00; A61K 9/68
[52] U.S. Cl. ........................................ 514/53; 514/23; 514/54; 536/115; 536/117; 536/4.1; 424/439; 424/48

[58] Field of Search ............... 514/53, 54, 55, 23; 536/4.1, 122, 115, 117, 125; 424/48, 439

[56] References Cited

U.S. PATENT DOCUMENTS

| | | | |
|---|---|---|---|
| 4,435,440 | 3/1984 | Hough et al. | 536/4.1 |
| 4,986,991 | 1/1991 | Yatka et al. | 424/48 |
| 4,992,276 | 2/1991 | Dills et al. | 424/439 |
| 5,006,571 | 4/1991 | Kumar et al. | 524/45 |
| 5,013,716 | 5/1991 | Cherukuri et al. | 514/54 |

*Primary Examiner*—Michael G. Wityshyn
*Assistant Examiner*—Louise N. Leary
*Attorney, Agent, or Firm*—Steven P. Berman

[57] ABSTRACT

This invention relates to liquid sucralose concentrate compositions comprising sucralose, a preservative system, a buffering system and a liquid.

7 Claims, No Drawings

LIQUID CONCENTRATE COMPOSITIONS

This is a continuation of application Ser. No. 628,287, filed Dec. 14, 1990, now abandoned.

BACKGROUND OF THE INVENTION

This invention relates to liquid sucralose concentrate compositions. Sucralose, 1,6-dichloro-1,6-dideoxy-β-D-fructofuranosyl-4-chloro-4-deoxy-α-galactopyranoside, is a potent high intensity sweetener, having a sweetness several hundred times that of sucrose. Its use as a sweetener and in sweetening compositions is disclosed in U.S. Pat. No. 4,435,440.

The preparation of 1,6-dichloro-1,6-dideoxy-β-D-fructofuranosyl-4-chloro-4-deoxy-α-galactopyranoside or as it is sometimes referred to in the literature, 4,1',6'-trichloro-4,1', 6'-trideoxygalactosucrose, (hereinafter referred to as "sucralose") involves the substitution of chlorine atoms in the sucrose molecule in one of the five secondary hydroxyl positions and in two of the three primary hydroxyl positions. This particular selection of positions usually means that any synthetic route must involve the preparation of an intermediate sucrose derivative having the required positions available for chlorination while the other positions are blocked. In particular, the reactive 6-position must be rendered available for chlorination.

Various process routes described in the literature include the routes set forth in Fairclough et al., Carbohydrate Research 40 (1975) 285–298 and U.S. Pat. Nos. 4,380,376, 4,362,869, 4,801,700 and 4,783,526. These various process routes all result in the preparation of sucralose in a pure, powder form. U.S. Pat. No. 4,343,934 discloses the crystalline powder form of sucralose. In some of the literature references, see for example, Jenner et al., J. Food Sci. 54(6), 1989, 1646–1649, it is generally indicated that concentrated aqueous solutions of sucralose can be prepared and diluted to any desired strength prior to addition to the product to be sweetened.

It is generally accepted that substances, such as high intensity sweeteners, are more stable in a dry format than in aqueous solutions. Such is, however, not the case with sucralose, which is less heat sensitive and therefore more stable in the liquid form than the powder form. Furthermore, the use of powdered sucralose may lead to some dusting problems which can be avoided by the use of a liquid concentrate form of sucralose. The liquid concentrate form can also be a more effective format to provide better dispensing and dispersion. It is found, however, that when sucralose is added to a liquid such as water or alcohol to form a concentrate, certain problems can occur when the resultant concentrate is retained for long periods; for example, discoloration and hydrolysis.

It is an object of the present invention to provide a liquid concentrate form of sucralose.

It is a further object of the present invention to provide a stable liquid concentrate form of sucralose that avoids discoloration and hydrolysis.

These and other objects of the present invention will become apparent to one skilled in the art from the detailed description hereinafter.

SUMMARY OF THE INVENTION

The foregoing objects and other features and advantages of the present invention are achieved by liquid sucralose concentrate compositions comprising sucralose, a suitable liquid, a suitable preservative system and a suitable buffering system wherein the pH of the composition is maintained between pH 4.0 and pH 5.5. Such compositions exhibit excellent stability and are resistant to discoloration and hydrolysis. The specific liquid sucralose concentrate compositions of the present invention provide simultaneously over extended time periods excellent resistance to hydrolysis and discoloration with the maintenance of preservative levels to achieve a broad spectrum of antimicrobial properties.

DETAILED DESCRIPTION OF THE INVENTION

Sucralose, 1,6-dichloro-1,6-dideoxy-β-D-fructofuranosyl-4-chloro-4-deoxy-α-galactopyranoside is, as stated above, a potent high intensity sweetener, having a sweetness several hundred times that of sucrose. The sucralose which is useful in the compositions of the present invention is a purified crystalline solid such as described in U.S. Pat. No. 4,343,934. Sucralose can be present in the compositions of the present invention at room temperature in an amount of from about 3.0% to about 35.0% by weight of the total composition depending on the desired sweetness concentration, with a preferred range of from about 20.0% to 28.0%. No recrystallization of sucralose is observed in the compositions of the present invention within the above ranges.

The liquids which can be utilized to dilute the crystalline sucralose to the desired concentrations are water and ethyl alcohol. The water can be any potable drinking water although distilled or filtered water is preferred. The ethyl alcohol should be USP quality. The liquid is present in an amount of from about 65.0% to 97.0% by weight of the total composition determined by the desired concentration of sucralose.

The liquid sucralose concentrate compositions of the present invention should also contain a preservative system to retard or inhibit microbial growth. This is of particular import when the composition is for multiple use or multiple dispensing from a container. Any food grade preservative can be successfully utilized in the compositions of the present invention. A preferred preservative system is a mixture of potassium sorbate and sodium benzoate in a 1:1 ratio. Other preservatives which can be utilized include potassium benzoate, methyl gallate, propyl gallate, ethylenediaminetetracetate, mixtures of methylparaben and propylparaben (3:1) and the like. The preservatives should be present in an amount of from about 0.05% to 3.0%, preferably from about 0.05% to about 0.6% by weight of the total composition.

The liquid sucralose concentrate compositions of the present invention should also contain a buffering system which is present to maintain the desired pH range during storage. The desired pH range is from about pH 4.0 to pH 5.5. These buffering systems can be comprised of a weak acid and the salt of a weak acid and/or a mixture of two acid salts. Suitable buffering systems include citric acid and sodium citrate or potassium citrate; phosphoric acid and sodium phosphate or potassium phosphate; amino acid bases and their acids such as arginine and arginine HCl, lysine and lysine HCl; tartaric acid and sodium tartrate or potassium tartrate; adipic acid and sodium adipate or potassium adipate; malic acid and sodium malate or potassium malate; sodium phosphate monobasic and sodium phosphate dibasic; and the like. The buffering system should be present in an amount of from about 0.05 to 2.0%, preferably from about 0.05 to 1.0% by weight of the total composition.

If desired, from about 25.0 to 97.0% propylene glycol can be added in place of or in addition to some of the liquid of the compositions of the present invention. The use of propylene glycol provides another fluid medium in which sucralose is soluble resulting in a less heat sensitive and therefore more stable form. The addition of propylene glycol also further inhibits undesired crystallization. Still further, if propylene glycol is utilized, the range of use of sucralose can be increased above the concentrations in aqueous solutions without any undesired effects.

The liquid sucralose concentrate compositions of the present invention can be prepared in accordance with standard formulation techniques. A preferred process involves adding the liquid to a suitable container and heating at from about 45° C. to 60° C. to enhance the solubility of the crystalline sucralose which is then added. The mixture is stirred for 10-15 minutes. A small amount of activated charcoal is then added to the sucralose solution as a processing aid and the resultant slurry is mixed gently for a period of about 10 to 15 minutes. The slurry is then filtered through a series of different size filters to remove the charcoal and the resultant filtrate is collected in a suitable container. The remaining ingredients are then added singly in the following sequence: the preservative system components followed by the buffering system components. These ingredients can also be added simultaneously. If propylene glycol is used, it is added either in place of the liquid or it is added to the liquid prior to the addition of the sucralose.

The liquid sucralose concentrate compositions of the present invention find utility as a sweetener in such foodstuffs as beverages, baked goods, preserved fruit forms, jellies, fruit desserts and the like. It should be kept in mind, however, that the utility of such compositions is not limited to the products above and such compositions may also find application in other products such as pharmaceuticals, tonics, cough medications and the like. A further embodiment is as a liquid table sweetener as a replacement for sucrose. To utilize the liquid sucralose concentrate compositions of the present invention in foodstuffs, it is necessary to dilute them to the desired sweetness level. This can be accomplished by the addition of purified water to the formulation at the desired level. Upon dilution only the clean, pleasant, sugar-like taste of sucralose is perceived with no "off flavor", "off odor" or "off color" observed.

Specific embodiments of the present invention are illustrated by the following representative examples. It will be understood, however, that the invention is not confined to the specific limitations set forth in the individual examples but rather to the scope of the appended claims.

EXAMPLE I

A liquid sucralose concentrate composition is prepared as follows: 37.125 kilograms of purified water are added to a jacketed stainless steel bath tank equipped with a stirring apparatus. The purified water is heated to about 45° C. and 12.50 kilograms of sucralose are added with stirring. Stirring is continued for fifteen minutes and 50.0 grams of activated carbon are then added and stirred for fifteen minutes. The resultant mixture is then filtered through a series of three declining sized filters (3μ, 1μ and 0.45μ) to remove the activated carbon. The resultant filtrate is collected in a second stainless steel batch tank. With stirring, 55.0 grams of sodium benzoate are added, followed by 55.0 grams of potassium sorbate, 129.0 grams of sodium citrate dihydrate and 136.0 grams of anhydrous citric acid. The temperature is maintained at 40° C. and the resultant mixture is stirred gently for twenty minutes.

The resultant formulation is as follows:

| Ingredient | % by weight |
| --- | --- |
| sucralose | 25.000 |
| potassium sorbate | 0.110 |
| sodium benzoate | 0.110 |
| citric acid, anhydrous | 0.272 |
| sodium citrate, dihydrate | 0.258 |
| purified water | 74.250 |
| | 100.000 |

The composition has a pH of 4.4 and is a clear, colorless solution and exhibits excellent stability over a two year period at room temperature.

EXAMPLE II

A liquid sucralose concentrate composition is prepared according to the procedure of Example I and has the following formulation:

| Ingredient | % by weight |
| --- | --- |
| sucralose | 15.000 |
| potassium sorbate | 0.200 |
| propyl gallate | 0.100 |
| citric acid, anhydrous | 0.370 |
| sodium citrate, dihydrate | 0.360 |
| purified water | 83.970 |
| | 100.000 |

The composition has a pH of 4.4 and is a clear, colorless solution and exhibits excellent stability.

EXAMPLE III

A liquid sucralose concentrate composition is prepared according to the procedure of Example I and has the following formulation:

| Ingredient | % by weight |
| --- | --- |
| sucralose | 30.000 |
| potassium sorbate | 0.100 |
| sodium ethylene diaminetetraacetate | 0.100 |
| citric acid, anhydrous | 0.366 |
| sodium citrate, dihydrate | 0.344 |
| purified water | 69.090 |
| | 100.000 |

The composition has a pH of 4.4 and is a clear, colorless solution and exhibits excellent stability.

EXAMPLE IV

A liquid sucralose concentrate composition is prepared according to the procedure of Example I and has the following formulation:

| Ingredient | % by weight |
| --- | --- |
| sucralose | 30.000 |
| methyl paraben | 0.050 |
| propyl paraben | 0.050 |
| citric acid, anhydrous | 0.272 |
| sodium citrate, dihydrate | 0.1378 |

-continued

| Ingredient | % by weight |
|---|---|
| purified water | 68.250 |
| | 100.000 |

The composition has a pH of 5.5 and is a clear, colorless solution and exhibits excellent stability.

EXAMPLE V

A liquid sucralose concentrate composition is prepared according to the procedure of Example I and has the following formulation:

| Ingredient | % by weight |
|---|---|
| sucralose | 25.000 |
| methyl gallate | 0.060 |
| propyl paraben | 0.060 |
| citric acid, anhydrous | 0.680 |
| sodium citrate, dihydrate | 0.645 |
| purified water | 73.555 |
| | 100.000 |

The composition has a pH of 4.5 and is a clear, colorless solution and exhibits excellent stability.

EXAMPLE VI

A liquid sucralose concentrate composition is prepared according to the procedure of Example I and has the following formulation:

| Ingredient | % by weight |
|---|---|
| sucralose | 10.000 |
| potassium sorbate | 0.150 |
| sodium benzoate | 0.150 |
| citric acid, anhydrous | 0.544 |
| sodium citrate, dihydrate | 0.516 |
| purified water | 88.640 |
| | 100.000 |

The composition has a pH of 4.5 and is a clear, colorless solution and exhibits excellent stability.

EXAMPLE VII

A liquid sucralose concentrate composition is prepared according to the procedure of Example I and has the following formulation:

| Ingredient | % by weight |
|---|---|
| sucralose | 25.000 |
| methyl gallate | 0.200 |
| propyl gallate | 0.200 |
| citrate acid, anhydrous | 0.413 |
| sodium citrate, dihydrate | 0.387 |
| purified water | 73.800 |
| | 100.000 |

The composition has a pH of 4.6 and is a clear, colorless solution and exhibits excellent stability.

EXAMPLE VIII

A liquid sucralose concentrate composition is prepared according to the procedure of Example I and has the following formulation:

| Ingredient | % by weight |
|---|---|
| sucralose | 25.000 |
| sodium benzoate | 0.400 |
| disodium phosphate | 0.300 |
| phosphoric acid (75% aqueous solution) | 0.350 |
| purified water | 73.950 |
| | 100.000 |

The composition has a pH of 4.6 and is a clear, colorless solution and exhibits excellent stability.

EXHIBIT IX

A liquid sucralose concentrate composition is prepared according to the procedure of Example I and has the following formulation:

| Ingredient | % by weight |
|---|---|
| sucralose | 28.000 |
| potassium sorbate | 0.110 |
| sodium benzoate | 0.110 |
| citric acid, anhydrous | 0.410 |
| sodium citrate, dihydrate | 0.387 |
| ethyl alcohol (70% aqueous solution) | 70.983 |
| | 100.000 |

The composition has a pH of 4.4 and is a clear, colorless solution and exhibits excellent stability.

EXAMPLE X

A liquid sucralose concentrate composition is prepared according to the procedure of Example I and has the following formulation:

| Ingredient | % by weight |
|---|---|
| sucralose | 33.330 |
| potassium sorbate | 0.050 |
| sodium benzoate | 0.050 |
| citric acid, anhydrous | 0.540 |
| sodium citrate, dihydrate | 0.516 |
| propylene glycol | 32.757 |
| purified water | 32.757 |
| | 100.000 |

The composition has a pH of 4.5 and is a clear, colorless solution and exhibits excellent stability.

EXAMPLE XI

A liquid sucralose concentrate composition is prepared according to the procedure of Example I and has the following formulation:

| Ingredient | % by weight |
|---|---|
| sucralose | 25.000 |
| potassium sorbate | 0.110 |
| sodium benzoate | 0.110 |
| citric acid | 0.544 |
| sodium citrate | 0.700 |
| propylene glycol | 72.536 |
| purified water | 1.000 |
| | 100.000 |

The composition has a pH of 4.6 and is a clear, colorless solution and exhibits excellent stability.

EXAMPLE XII

A liquid sucralose concentrate composition is prepared according to the procedure of Example I and has the following formulation:

| Ingredient | % by weight |
| --- | --- |
| sucralose | 35.000 |
| potassium sorbate | 0.070 |
| sodium benzoate | 0.110 |
| citric acid | 0.272 |
| sodium citrate, dihydrate | 0.258 |
| ethanol (70% aqueous) | 37.125 |
| propylene glycol | 37.125 |
| | 100.000 |

The composition has a pH of 4.0 and is a clear, colorless solution and exhibits excellent stability.

EXAMPLE XIII

To demonstrate the use of the liquid sucralose concentrate composition of the present invention, a reduced calorie apple pie filling is prepared by dissolving 25.0 g. modified starch in 200.0 g. of water with stirring. The remaining water is then added and the starch solution is slowly brought to 180° F. and held for 5 to 8 minutes and then removed from the heat. 1.6 g. of the liquid sucralose concentrate is then added followed by 600.0 g. of cut-up apples, 3.0 g. of cinnamon powder and 3.0 g. of lemon juice and the resulting product is stirred gently for about two minutes.

The filling has the following formulation:

| Ingredient | % by weight |
| --- | --- |
| apples | 60.00 |
| starch | 2.50 |
| cinnamon | 0.30 |
| lemon juice | 0.30 |
| liquid sucralose concentrate (25%) | 0.16 |
| water | q.s. to 100 |

The above filling can be added to a suitable pie crust and baked to obtain a reduced calorie apple pie.

An identical reduced calorie apple pie filling is prepared in accordance with the procedure of this Example XIII except that the liquid sucralose concentrate is replaced by an equal amount (based on sweetness) of crystalline sucralose (0.04 g). Controlled sensory panels are then conducted and the results indicate no statistically significant difference in the flavor, texture or quality of sweetness between the two reduced calorie apple pie fillings.

EXAMPLE XIV

A reduced calorie lemonade flavored beverage is prepared by adding the various ingredients to water and has the following formulation:

| Ingredient | % by weight |
| --- | --- |
| liquid sucralose concentrate (25%) | 0.070 |
| sodium benzoate | 0.030 |
| citric acid | 0.600 |
| flavoring & coloring | 0.490 |
| water | q.s. to 100 |

An identical reduced calorie lemonade flavored beverage is prepared in accordance with the procedure of this Example XIV except that the liquid sucralose concentrate is replaced by an equal amount (based on sweetness) of crystalline sucralose (0.0175 g.). Controlled sensory panels are then conducted and the results indicate no statistically significant difference in the flavor, texture or quality of sweetness between the two reduced calorie lemonade flavored beverages.

What is claimed is:

1. A liquid sucralose concentrate composition consisting essentially of sucralose, a preservative system selected from the group consisting of potassium sorbate, sodium benzoate, potassium benzoate, methyl gallate, propyl gallate, ethylenediaminetetraacetate, methyl paraben, propyl paraben and mixtures thereof, a buffering system selected from the group consisting of citric acid and sodium citrate, citric acid and potassium citrate, phosphoric acid and sodium phosphate, phosphoric acid and potassium phosphate, arginine and arginine HCl, lysine and lysine HCl, tartaric acid and sodium tartrate, tartaric acid and potassium tartrate, adipic acid and sodium adipate, adipic acid and potassium adipate, malic acid and sodium malate, malic acid and potassium malate, and sodium phosphate monobasic and sodium phosphate dibasic and a liquid wherein the pH of the composition is from about pH 4.0 to about pH 5.5.

2. The liquid sucralose concentrate composition of claim 1 wherein the liquid is selected from the group consisting of water and ethyl alcohol.

3. The liquid sucralose concentrate composition of claim 2 wherein the liquid is present in an amount of from about 65.0% to 97.0% by weight of the total composition.

4. The liquid sucralose concentrate composition of claim 1 wherein the sucralose is present in an amount of from about 3.0% to 35.0% by weight of the total composition.

5. The liquid sucralose concentrate composition of claim 1 wherein the buffering system is present in an amount of from about 0.05% to 2.0% by weight of the total composition.

6. The liquid sucralose concentrate composition of claim 1 wherein the preservative system is present in an amount of from about 0.05 to 3.0% by weight of the total composition.

7. The liquid sucralose concentrate composition of claim 1 wherein some or all of the liquid is propylene glycol.

* * * * *